W. F. GANSTER.
PIPE WALL SCRAPER.
APPLICATION FILED APR. 15, 1921.

1,411,965.

Patented Apr. 4, 1922.

WITNESSES
E. A. Wilson
A. L. Kitchin

INVENTOR
WILLIAM F. GANSTER
BY Munn & Co
ATTORNEYS

UNITED STATES PATENT OFFICE.

WILLIAM F. GANSTER, OF NEW YORK, N. Y.

PIPE-WALL SCRAPER.

1,411,965. Specification of Letters Patent. Patented Apr. 4, 1922.

Application filed April 15, 1921. Serial No. 461,526.

*To all whom it may concern:*

Be it known that I, WILLIAM F. GANSTER, a citizen of the United States, and a resident of the city of New York, Maspeth, borough of Queens, in the county of Queens and State of New York, have invented a new and Improved Pipe-Wall Scraper, of which the following is a full, clear, and exact description.

This invention relates to pipe scraping devices and has for an object to provide an improved construction which may be readily adjusted for fitting different size pipes so as to readily scrape the interior walls thereof.

Another object of the invention is to provide a scraping device for the walls of pipes which can be automatically adjusted to fit the pipe and which may be readily operated for scraping the walls evenly without injury to the pipe or the scraper.

A still further object, more specificially, is to provide a scraper for pipes in which a minimum number of parts are used with an arrangement which is simple and yet strong and effective.

In the accompanying drawing—

Figure 1:
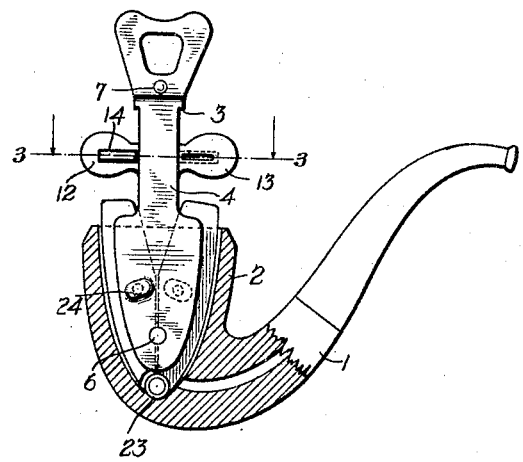
Figure 1 is a side view of a scraper embodying the invention, the same being shown arranged in the pipe ready for use, said pipe being partially in section.
Figure 2:
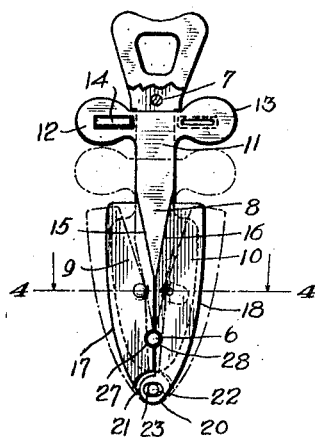
Figure 2 is a view of the scraper similar to that shown in Figure 1 but with one plate removed for illustrating the interior operating parts.
Figure 3:
Figure 3 is a sectional view through Figure 1 approximately on line 3—3, the same being on an enlarged scale.
Figure 4:
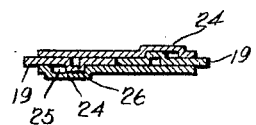
Figure 4 is a sectional view through Figure 2 on line 4—4, the same being on an enlarged scale.

Referring to the accompanying drawing by numerals, 1 indicates a pipe of any desired kind having a bowl 2. The scraper 3 is provided with front and rear plates 4 and 5 which are identical and which are held together by suitable rivets 6 and 7, though they may be connected by welding or other means as desired. From rivet 7 to the lower end of the scraper there is a space provided between the plates 4 and 5 for accommodating the spreading wedge 8 and the scraping blades 9 and 10. The spreading wedge 8 merges into a body or shank 11 which in turn merges into laterally extending thumb and finger members 12 and 13. Each of these members is provided with pressed out sections 14 which act as a stop for preventing lateral movement of the wedge member. The wedge 8 is pointed as shown in Figure 2 and engages the bevel or chamfered edges 15 and 16 of the scraping blades 9 and 10. These scraping blades are provided with curved outer edges 17 and 18 designed to fit the inner surface of the walls of the bowl 2.

In order to produce a good fit for different size bowls, the wedge 8 is moved downwardly for spreading the scraping blades 9 and 10 as shown in dotted lines in Figure 2. These scraping blades may have their edges sharpened but preferably the edges are formed merely with right angle corners 19 which producs the desired cutting or scraping action. The blades 9 and 10 are provided at their lower ends with overlapping ears 20 and 21, ear 21 carrying preferably a pin 22 which is rigidly secured thereto and slides within the slot 23 in ear 20. This permits a hinge action to the scraping blades and also a lateral sliding action within certain limits. In order to hold the blades in proper relation to the front and back plates 4 and 5, each of the plates 4 and 5 is provided with a pressed out section 24 having an elongated recess 25 produced thereby into which a lug 26 from the respective blades 9 and 10 extend. The blades 9 and 10 are also cut away at 27 and 28 to accommodate the rivet 6. By this construction and arrangement, the scraper may be inserted into the bowl 2 and then the thumb members 12 and 13 pressed downwardly which will cause the wedge 8 to co-act with the chamfered or beveled edges 15 and 16 and thereby spread the scraper blades until they engage the walls of the bowl.

The parts are held in this position by the pressure of the hand while the device is rotated preferably by causing one of the fingers and thumb to press against the sides of the thumb members 12 and 13. In this way the thumb members 12 and 13 act as means for depressing the wedge 8 and also as handle or levers for rotating the entire device.

What I claim is:—

1. A scraper for smoking pipes comprising a body formed from a pair of plates, a pair of scraping blades carried by said body and pivotally connected together at one end and means carried by said body for spreading said scraping blades.

2. A scraper for smoking pipes comprising a pair of pivotally connected blades adapted to fit into the bowl of the pipe, said pivotal connection being formed so as to allow a loose motion, a body for holding the blades adjacent each other and a spreading wedge formed with manually actuated means whereby the blades may be spread to properly fit said bowl so as to scrape the walls thereof when the device is rotated.

3. A scraper for smoking pipe bowls comprising a body having spaced front and back plates, each of said plates having a groove therein, a pair of scraping blades provided with means projecting into the respective grooves whereby said blades may be moved toward and from each other and held in position by said front and back plates and a wedge arranged between said front and back plates for spreading said blade, said wedge being formed with hand operating means for causing the wedge to function.

4. A scraper for smoking pipe bowls comprising a body provided with front and back plates, each of said plates being formed with a pressed out portion presenting a lateral extending groove, a pair of scraping blades pivotally connected together at one end and arranged so as to fit between said front and back plates, each of said blades having a pressed out portion adapted to fit into the respective grooves in said front and back plates and a wedge slidingly positioned between said plates arranged to act on said scraping blades to move the blades apart pivotally when the wedge is forced in one direction.

WILLIAM F. GANSTER.